United States Patent [19]
Means

[11] 3,953,782
[45] Apr. 27, 1976

[54] VOLTAGE CONVERTER SYSTEM WITH ON-OFF CONTROL

[75] Inventor: William A. Means, Rockford, Ill.

[73] Assignee: Applied Motors, Inc., Rockford, Ill.

[22] Filed: Feb. 26, 1975

[21] Appl. No.: 553,314

[52] U.S. Cl. .............................. 321/28; 307/10 R; 307/142; 317/154
[51] Int. Cl.² ....................................... B60R 18/00
[58] Field of Search ................. 307/9, 10 R, 47, 48, 307/49, 85, 114, 134, 139, 142; 317/135 R, 140, 154; 318/17; 321/28, 31, 63; 322/86, 88

[56] References Cited
UNITED STATES PATENTS

| | | | |
|---|---|---|---|
| 2,277,578 | 3/1942 | Booth | 317/154 X |
| 3,456,119 | 7/1969 | Schneider | 307/10 R |
| 3,497,709 | 2/1970 | Chilton et al. | 307/10 R |
| 3,665,502 | 5/1972 | Means | 321/28 |
| 3,681,611 | 8/1972 | Watson | 307/10 R |

Primary Examiner—A. D. Pellinen
Attorney, Agent, or Firm—Wolfe, Hubbard, Leydig, Voit & Osann, Ltd.

[57] ABSTRACT

The converter includes a dc. motor energizable from a battery and adapted to drive an alternator which produces an ac. output for powering a remote load device. The latter is adapted to be connected to the converter by a three-wire extension cord having a ground wire for grounding the load device. A manually operable switch is located near the output end of the extension cord and is connected across the ground wire and one of the conducting wires of the cord. The motor of the converter may be started by momentarily closing the switch and may be stopped when the switch is next closed momentarily.

6 Claims, 2 Drawing Figures

VOLTAGE CONVERTER SYSTEM WITH ON-OFF CONTROL

BACKGROUND OF THE INVENTION

This invention relates to a voltage converter system of the same general type as disclosed in my U.S. Pat. No. 3,665,502. One of the embodiments disclosed in that patent comprises a motor-alternator set having a dc. motor energizable from a battery and having an alternator which produces an ac. voltage at its output. By connecting an ac. load device, such a tool with an induction motor, to the output of the converter, the load may be powered from the battery.

In many instances, such a motor-alternator converter is carried in a car or truck and is connected to the battery thereof so as to provide the user with mobile electrical energy for operating a power tool or the like at a location where utility electric service is unavailable. Generally speaking, a person who uses an ac. powered tool served by a vehicle-carried converter will connect the tool to the converter output with a relatively long three-wire extension cord having a ground wire for grounding the tool through the converter to the vehicle frame. To avoid needless drain on the battery, it is desirable to turn off the converter motor when the tool is not being operated. In the system disclosed in the aforementioned patent, the converter motor may be turned on and off at the working area so that the user need not walk back and forth between the working area and the converter each time it is desired to start or stop the motor.

SUMMARY OF THE INVENTION

The general aim of the present invention is to provide a new and improved dc. to ac. voltage converter system which provides the user with the capability of turning the converter motor on and off at a remote working area and which is lower in cost and more reliable in operation than prior systems of the same general type.

A more detailed object is to provide a system in which advantage is taken of the ground wire and one conducting wire of a standard, mass produced three-wire extension cord to enable a motor-controlling switch to be inexpensively located near the working area and to enable the system to employ reliable and low cost components which respond to the switch to turn the converter motor on and off.

Still another object is to provide a system which guards against unsafe starting of the load device by insuring against starting of the converter motor unless the operator is near the load device.

These and other objects and advantages of the invention will become more apparent from the following detailed description when taken in conjunction with the accompanying drawings.

DETAILED DESCRIPTION OF THE PREFERRED EMBODIMENTS

Figure 1:
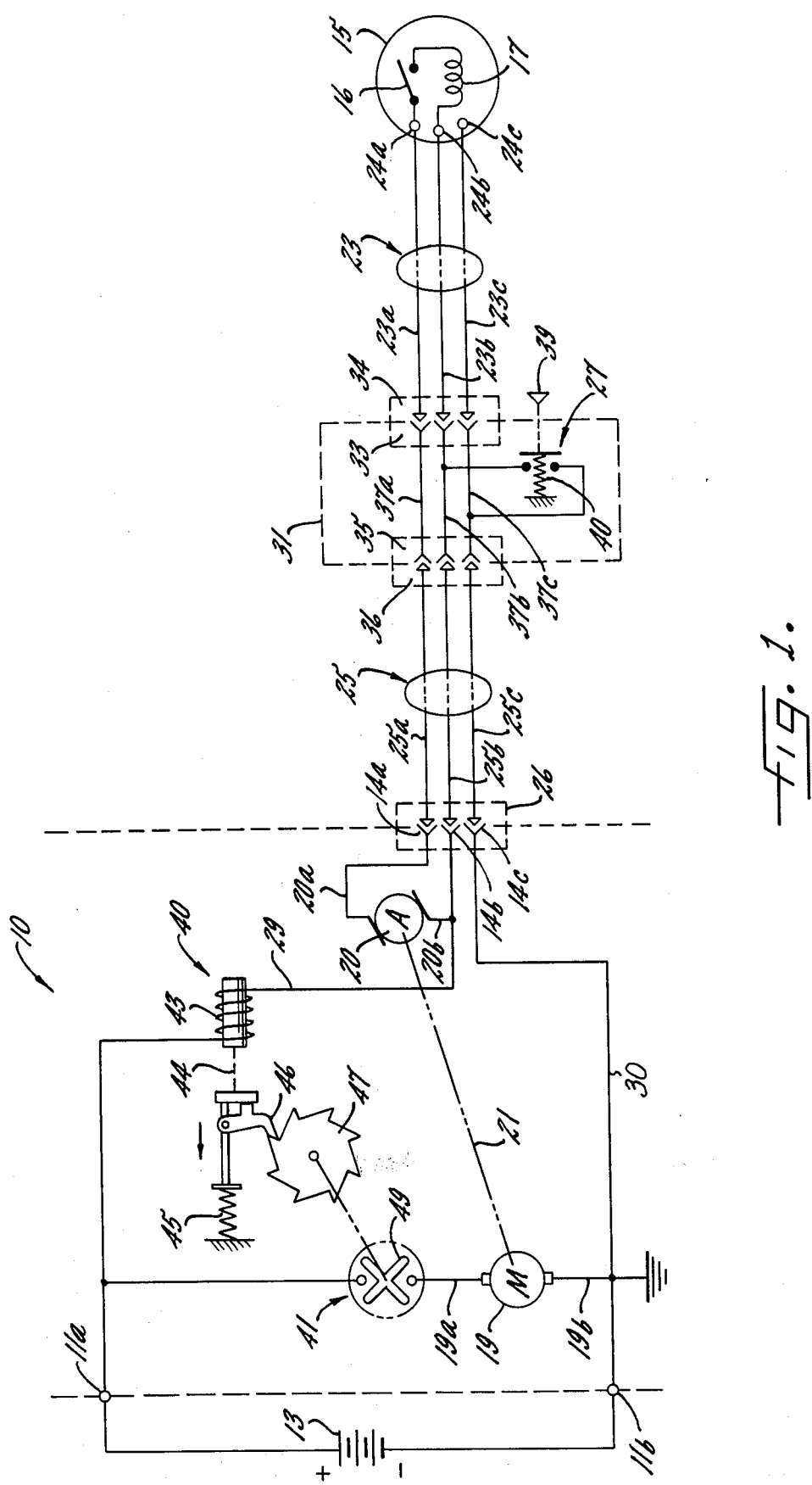
FIG. 1 is a schematic diagram of an exemplary voltage converter system incorporating the features of the invention, the system being shown in association with an energy-supplying battery and a connected load device.

One preferred and exemplary embodiment of a dc. to ac. voltage converter system 10 incorporating the features of the invention includes input terminals 11a, 11b adapted to be removably connected to a battery 13. The battery may typically and for example be a conventional automotive or truck battery providing an output voltage of 12 volts dc. and having a storage capacity of some 100 to 200 amperes.

The converter 10 further includes output terminals 14a and 14b and a ground terminal 14c adapted for connection to an electrical load device 15 which consists of an on-off switch 16 and a motor, transformer or other unit 17 energizable by ac. voltage. As a concrete example, the load device 15 might be an electric power tool in which the unit 17 is an induction motor rated for operation with an input voltage of 120 volts ac.

Herein, the principal converter apparatus is shown as a motor-alternator set constituted by (a) a motor 19 having input leads 19a, 19b connected to the input terminals 11a, 11b and (b) an alternator 20 having output leads 20a, 20b connected to the output terminals 14a, 14b. The motor and alternator may be physically separate units of conventional organization with armatures mechanically coupled by a shaft 21 or they may have their rotor windings mounted on a common rotor journaled within a common stator. The motor is rated for operation from the voltage (e.g., 12 volts dc.) provided by the battery 13 whereas the alternator is designed and rated to produce (when driven at rated speed by the motor) an output voltage substantially corresponding to the rated operating voltage of the load device 15.

The load device 15 further comprises a three-wire power cord 23 having conducting wires 23a and 23b connected to the input terminals 24a, 24b of the unit 17 and having a ground wire 23c adapted to be connected to the grounding terminal 24c of the device. To enable the load device to be operated at a long distance from the converter 10, there is provided a long three-wire extension cord 25 having conductor leads or wires 25a, 25b and a ground lead or wire 25c adapted to be connected to the conducting wires 23a, 23b and the ground wire 23c, respectively, of the power cord of the load device. The input end of the extension cord may be connected to the output terminals 14a, 14b and the ground terminal 14c of the converter by a plug and socket coupling 26.

According to the present invention, a first dc. energizing path is established through the ground terminal 14c and one of the output terminals 14a, 14b of the converter apparatus 10 in order to enable the motor 19 to be turned on and off by means of a manually operable switch 27 located near the output end of the extension cord 25. As a result, the motor may be controlled from a remote location near the load device 15 and yet the control for the motor may be made of low cost and reliable components and makes advantageous use of the standard three-wire extension cord.

In this instance, the first dc. energizing path is established by connecting the output terminal 14b of the converter 10 to the input terminal 11a with a conductor 29 and by connecting the ground terminal 14c and the input terminal 11b to a common ground. For convenience of illustration, a conductor 30 has been schematically shown as connecting the ground terminal 14c to the same ground as the input terminal 11b.

When the output terminal 14b and the ground terminal 14c are bridged, current from the positive post of the battery 13 flows along the first energizing path to the input terminal 11a, the conductor 29 and the output terminal 14b and thence to the ground terminal 14c, the conductor 30 and back to the negative post of the battery. Such bridging is achieved herein by the switch 27 which is associated with a coupler unit in the form of a small box 31 located near the load device 15 and having a first coupler or socket 33 for detachably receiving a connector plug 34 on the power cord 23 and having a second coupler or socket 35 for detachably receiving a connector plug 36 on the output end of the extension cord 25. Conductors 37a, 37b and 37c within the box serve to connect the wires 23a, 23b and 23c to the wires 25a, 25b and 25c when the two cords are plugged into the box.

The switch 27 is connected across the conductors 37b and 37c and is adapted to be closed when a push button 39 on the outside of the box 31 is manually depressed. A spring 40 is associated with the switch and causes the switch to open automatically when the push button is released. Closure of the switch completes the above-described energizing circuit from the positive terminal of the battery 13 to the output terminal 14b of the converter 10 and thence to the ground terminal 14c back to the negative post of the battery.

In keeping with the invention, means 40 are connected in series with the switch 27 and respond to successive manual closings of the switch to render a switching means 41 successively conductive and nonconductive. The switching means 41 is connected in a second series path which includes the input terminals 11a, 11b and the motor leads 19a, 19b and thus the motor 19 is turned on when the switching means is rendered conductive and is turned off when the switching means is rendered non-conductive.

Herein, the responding means 40 is a solenoid whose coil 43 is connected to be energized by current flowing through the conductor 29. The armature 44 of the solenoid normally is biased to a retracted position by a spring 45 and is extended outwardly when the solenoid is energized. Carried on the armature is a pivoted pawl 46 which, when the armature is extended, indexes a multi-toothed ratchet 47 through one step. When the armature is retracted, the pawl pivots idly past the ratchet and leaves the latter stationary.

The ratchet 47 is associated with the switching means 41 which herein is shown as comprising a rotary switching member 49. When indexed through successive steps, the switching member first completes and then interrupts the second energizing path which extends to the motor 19 from the input terminals 11a, 11b via the leads 19a, 19b.

Assuming that the motor 19 is off, the foregoing arrangement enables the motor to be started by momentarily depressing the push button 39 associated with the remote box 31 at the output end of the extension cord 25. When the push button is depressed, the switch 27 is closed and causes energization of the solenoid 40 to extend the armature 44 and index the switching member 49 through one step by way of the pawl 46 and the ratchet 47. Upon indexing, the switching member completes the energizing path to the motor 19 and thus the latter is supplied with current from the battery 13. When the push button 39 is released, the solenoid 40 is de-energized and its armature 44 is retracted, but the pawl 46 simply retracts idly past the ratchet 47 so as to leave the rotary switching member in its "closed" position and thus maintain the energizing path to the motor.

When the push button 39 is next momentarily depressed, the solenoid 40 is again energized and indexes the rotary switching member 49 to its next or "open" position. Thus, the energizing path to the motor 19 is interrupted and the motor is turned off until the push button is again depressed. Accordingly, the motor can be both started and stopped by means of the single push button 39.

Figure 2:
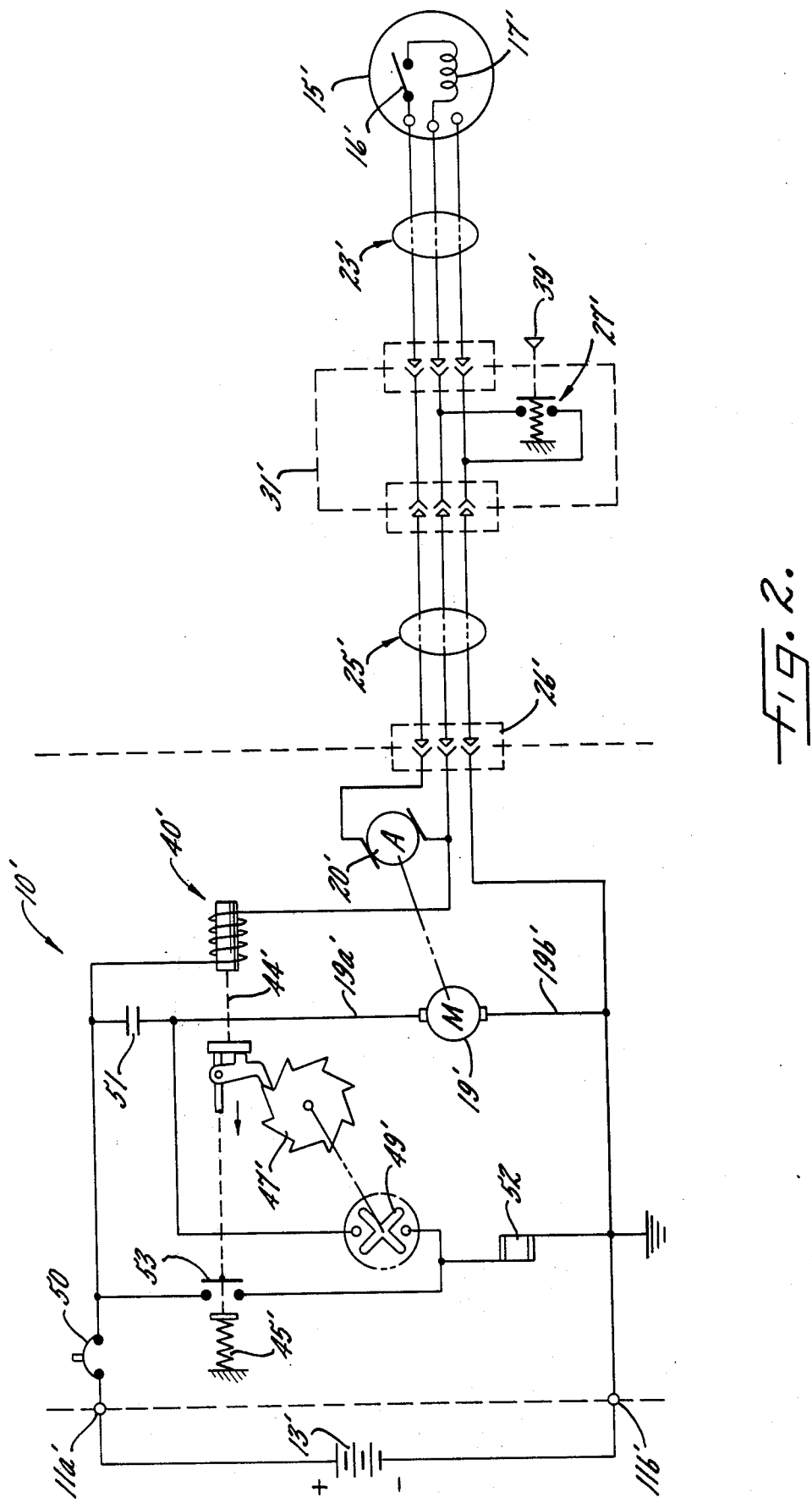
FIG. 2 is a diagram similar to FIG. 1 but shows a second embodiment of the invention.

The embodiment of the converter system 10' shown in FIG. 2 has a further advantage in that if current flow to the motor 19' is interrupted independently of the switching member 49', the motor cannot be re-started until the operator is in the area of the load device 15' and depresses the push button 39'. By way of example, current flow to the motor 19' might be interrupted independently of the switching member 49' by virtue of the operator disconnecting the input terminals 11a', 11b' from the battery 13' while the motor is running or by virtue of a resettable thermal overload 50 dropping out. In either instance, the switching member would be left in its closed position and, in the embodiment shown in FIG. 1, the motor would start immediately when the operator re-connected the input terminals to the battery or reset the thermal overload. The load device 15 shown in FIG. 1 thus could start while the operator is at the converter 10 rather than in proximity to the load device and could produce an unsafe condition.

To avoid any danger of unsafe starting of the load device 15', the converter apparatus 10' shown in FIG. 2 includes, in the second energizing path (which comprises the input terminals 11a', 11b', the motor leads 19a', 19b' and the motor 19') a switching means which herein is formed by the normally open contacts 51 of a relay 52. The latter is connected across the input terminals 11a', 11b' both in parallel and in series with the contacts 51 and is adapted to be energized upon each energization of the solenoid 40' in the first energizing path which includes the push button-actuated switch 27'. To energize the relay 52 and close the contacts 51, the armature 44' of the solenoid is connected to close switch contacts 53 each time the solenoid is energized, the contacts 53 being connected in series with the relay and in parallel with the relay contacts 51. The relay also is connected in series with the rotary switching member 49' which is connected in series with the relay contacts 51. The solenoid 40' thus comprises a means which responds to closing of the switch 27' to effect closing of switching means in the form of relay contacts 51 in the energizing path of the motor 19'.

In order to explain the operation of the converter apparatus 10' shown in FIG. 2, let it be assumed that the battery 13' is properly connected to the input terminals 11a', 11b', that the thermal overload 50 has not been tripped and that the motor 19' has been stopped because of the rotary switching member 49' being indexed to its open position as a result of the operator depressing the push button 39'. Now, when the operator next depresses the push button, the switch 27' closes and energizes the solenoid 40' to extend the armature 44'. The rotary switching member 49' thus is stepped to its closed position and, at the same time, the switch contacts 53 are closed. Closure of the contacts 53 energizes the relay 52 which thus picks up its contacts 51 to start the motor 19' and simultaneously establish a sealing circuit to the relay via the closed contacts 51 and the switching member 49'. Accordingly, the relay 52 remains energized by way of the contacts 51 and the switching member 49' when the push button 39' is released to de-energize the solenoid 40' and open the switch contacts 53. The energizing circuit to the motor thus is maintained by virtue of the closed contacts 51 of the relay 52.

If the operator again depresses the push button 39', the solenoid 40' steps the switching member 49' to its open position to interrupt the sealing circuit to the relay 52. When the push button is released to de-energize the solenoid, the contacts 53 open to de-energize the relay and thus cause opening of the relay contacts 51 to stop the motor 19'. Subsequent closing of the switch 27' under normal conditions energizes the solenoid to again start the motor.

Now, if the thermal overload 50 should cut out or if the operator disconnects the battery 13' from the input terminals 11a', 11b' while the rotary switching member 49' is in its closed position and while the motor 19' is running, the motor will, of course, stop immediately. Also, the current flow to the switch 27', the relay 52 and the relay contacts 51 will be interrupted. The switching member 49' will, however, remain in its closed position as would the switching member 49 of the converter apparatus 10 shown in FIG. 1. But, when the operator resets the overload 50, or reconnects the battery 13' to the terminals 11a', 11b', the motor 19' shown in FIG. 2 cannot start immediately because the relay 52 is de-energized, its contacts 51 are open, and the switch contacts 53 are open. Accordingly, the operator must walk back to the control box 31' and depress the push button 39' to move the switching member 49' from its closed position to its open position. As an incident thereto, the switch contacts 53 will close to energize the relay 52 and turn on the motor 19' via the relay contacts 51. The motor will, however, stop immediately when the push button is released to de-energize the solenoid 40' and open the switch contacts 53. Thus, the operator must depress the push button again to move the switching member 49' to its closed position, energize the relay 52 by way of the switch contacts 53, and seal in the relay through its contacts 51 and the switching member 49' in order to re-start the motor and keep the motor running when the push button is released. Accordingly, when the dc. energizing circuit to the motor 19' is interrupted independently of the relay contacts 51, the motor cannot be re-started until the push button 39' is depressed twice. This absolutely insures against unsafe starting of the load device 15' when the operator is not near the load device.

In the appended claims, the terms "actuated" and "actuation" as used to describe the operation of a switch (such as the manually operable switch 27, 27') refer to the complete action of such switch upon first closing and then opening and are not intended to mean that such switch is first actuated when closed and again actuated when opened.

I claim:

1. A voltage converter system having:
   a input terminals adapted for connection to a battery, output terminals adapted for connection to an electrical load device rated for operation from an ac. voltage, and a ground terminal adapted for connection to the grounding terminal of the load device;
   b a motor-alternator set including:
   b1 a dc. motor having input leads connected to said input terminals and rated for energization from the voltage of said battery, and
   b2 an alternator having output leads connected to said output terminals and rated to produce an ac. voltage corresponding substantially to the rated operating voltage of said output device;
   c a normally open switch connected in a first series path which includes said input terminals, said ground terminal, and one of said output terminals, said switch being rendered conductive when manually actuated and being operable when conductive to cause current to flow through said first series path from said battery when the latter is connected to said input terminals;
   d a switching means connected in a second series path with said input leads and said input terminals; and
   e means in said first series path and responsive to current flow resulting from manual actuation of said switch to render said switching means conductive when said switch is first manually actuated and to render said switching means non-conductive when said switch is next manually actuated, said switching means being operable when conductive to cause current to flow through said second series path from said battery when the latter is connected to said input terminals, whereby successive manual actuations of said switch cause said motor to be successively energized and de-energized.

2. A voltage converter system as defined in claim 1 in which said switching means (d) comprises a member which is rendered conductive when first moved in one direction and which is rendered non-conductive when next moved in said one direction, said responsive means (e) including means operable to move said member in said one direction each time said switch (c) is rendered conductive and to leave said member stationary when said switch is rendered non-conductive.

3. A voltage converter system as defined in claim 1 for use with an extension cord having a first lead connectable to said one output terminal, a second lead connectable to the other output terminal, and a third lead connectable to said ground terminal, said cord having means on one end thereof for detachably connecting the leads of the cord to the respective terminals, and said switch (c) being located adjacent the opposite end portion of said cord and being connected across said first and third leads of said cord.

4. A voltage converter system as defined in claim 3 for use with a load device having a power cord with first, second and third leads connectable to the respective leads of said extension cord, said power cord and the opposite end of said extension cord having connectors thereon, said voltage converter system further including a coupler unit having couplers for detachably coupling with the connectors on said cords and having first, second and third conductors for electrically connecting the respective leads of said cords, and said switch (c) being carried by said coupler unit and being connected across the first and third conductors thereof.

5. A voltage converter system as defined in claim 1 further including:
   f means for rendering said switching means (d) non-conductive when said switching means is conductive and energizing current to said second series path is interrupted independently of said switching means, and said means (f) keeping said switching means non-conductive when energizing current to said second series path is restored and until said switch is manually actuated.

6. A voltage converter system having:

a input terminals adapted for connection to a battery, output terminals adapted for connection to an electrical load device rated for operation from an ac. voltage, and a ground terminal adapted for connection to the grounding terminal of the load device;

b a motor-alternator set including:
- b1 a dc. motor having input leads connected to said input terminals and rated for energization from the voltage of said battery, and
- b2 an alternator having output leads connected to said output terminals and rated to produce an ac. voltage corresponding substantially to the rated operating voltage of said output device;

c a manually operable switch connected in a first series path which includes said input terminals, said ground terminal, and one of said output terminals, said switch being operable when closed to cause current to flow through said first series path from said battery when the latter is connected to said input terminals;

d a switching means connected in a second series path with said input leads and said input terminals; and e means in said first series path and responsive to current flow resulting from closure of said switch to change said switching means between conductive and non-conductive states, and said switching means being operable when conductive to cause current to flow through said second series path from said battery when the latter is connected to said input terminals.

* * * * *